United States Patent
Muiter et al.

(10) Patent No.: US 10,441,083 B2
(45) Date of Patent: Oct. 15, 2019

(54) DEPLOYABLE AND RETRACTABLE WRITING SURFACE

(71) Applicant: Ford Global Technologies, LLC, Dearborn, MI (US)

(72) Inventors: James Hadley Muiter, Plymouth, MI (US); Christopher Jacob Lockwood, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 15/435,634

(22) Filed: Feb. 17, 2017

(65) Prior Publication Data

US 2018/0235372 A1    Aug. 23, 2018

(51) Int. Cl.
| | |
|---|---|
| *A47C 7/70* | (2006.01) |
| *F16B 1/00* | (2006.01) |
| *B60N 3/00* | (2006.01) |
| *A47B 17/06* | (2006.01) |
| *B60N 2/75* | (2018.01) |

(52) U.S. Cl.
CPC ............... *A47C 7/70* (2013.01); *A47B 17/06* (2013.01); *B60N 2/793* (2018.02); *B60N 3/002* (2013.01); *F16B 1/00* (2013.01); *F16B 2001/0035* (2013.01)

(58) Field of Classification Search
CPC .............. A47B 17/06; A47B 17/065; F16B 1001/0035; F16B 2001/0035
USPC ..... 297/188.14, 188.15, 188.16, 188.17, 145
See application file for complete search history.

(56) References Cited

U.S. PATENT DOCUMENTS

| | | | |
|---|---|---|---|
| 994,797 A * | 6/1911 | Streit | A47B 19/06 |
| | | | 248/447.2 |
| 2,524,909 A | 10/1950 | Hines | |
| 3,083,998 A | 4/1963 | Morris | |
| 3,260,541 A | 7/1966 | Sadler | |
| 3,338,629 A * | 8/1967 | Drees | B60N 3/002 |
| | | | 224/275 |
| 3,497,076 A | 2/1970 | Obrien | |
| 3,632,161 A * | 1/1972 | Arfaras | A47C 7/70 |
| | | | 297/145 |
| 4,040,659 A * | 8/1977 | Arnold | A47B 31/06 |
| | | | 297/188.17 |
| 4,809,897 A * | 3/1989 | Wright, Jr. | B60N 3/101 |
| | | | 220/521 |
| 4,834,449 A * | 5/1989 | Engelman | A47B 3/14 |
| | | | 108/134 |
| 4,928,865 A * | 5/1990 | Lorence | B60N 3/102 |
| | | | 224/275 |
| 5,042,877 A | 8/1991 | Yokota | |
| 5,076,524 A | 12/1991 | Reh | |
| 5,087,096 A | 2/1992 | Yamazaki | |
| 5,116,099 A | 5/1992 | Kwasnik | |
| 5,372,403 A | 12/1994 | Puerto | |
| 5,516,191 A | 5/1996 | McKee | |

(Continued)

*Primary Examiner* — Jose V Chen
(74) *Attorney, Agent, or Firm* — Vichit Chea; Brooks Kushman P.C.

(57) ABSTRACT

A deployable armrest writing assembly comprises an armrest, a writing surface, and a bridging segment. The bridging segment is connected to the writing surface. The bridging segment is pivotable with respect to the armrest and the writing surface so as to pivot the writing surface 180° from a storage configuration to a deployed configuration over a top surface of the armrest.

20 Claims, 8 Drawing Sheets

(56) References Cited

U.S. PATENT DOCUMENTS

| | | | | |
|---|---|---|---|---|
| 5,556,017 | A * | 9/1996 | Troy | B60R 11/0241 |
| | | | | 224/275 |
| 5,620,228 | A * | 4/1997 | Ito | A47C 7/68 |
| | | | | 297/188.17 |
| 5,671,686 | A | 9/1997 | Hurley et al. | |
| 5,779,302 | A * | 7/1998 | Geier | B60N 3/102 |
| | | | | 297/188.17 |
| 6,032,587 | A | 3/2000 | Salenbauch et al. | |
| 6,619,738 | B1 * | 9/2003 | Filipovich | B60N 3/08 |
| | | | | 297/188.16 |
| 6,929,304 | B1 | 8/2005 | Dry | |
| 6,997,508 | B2 | 2/2006 | Jaaska | |
| 7,520,552 | B2 | 4/2009 | Nakamura | |
| 7,604,291 | B2 | 10/2009 | Vitito | |
| 7,798,072 | B2 * | 9/2010 | Becker | B60N 3/002 |
| | | | | 108/42 |
| 8,262,158 | B2 * | 9/2012 | Kim | B60K 35/00 |
| | | | | 297/115 |
| 8,668,258 | B2 | 3/2014 | Uwague-Igharo | |
| 8,813,657 | B2 | 8/2014 | Winter | |
| 8,944,390 | B2 | 2/2015 | Deerberg | |
| 2006/0083582 | A1 | 4/2006 | Balsells | |
| 2012/0319440 | A1 * | 12/2012 | Andersson | B60N 3/102 |
| | | | | 297/188.17 |
| 2013/0249256 | A1 * | 9/2013 | Payne, Jr. | A47C 7/50 |
| | | | | 297/161 |
| 2013/0255044 | A1 * | 10/2013 | Chen | A47C 1/124 |
| | | | | 24/572.1 |
| 2016/0375810 | A1 * | 12/2016 | Kong | B60N 2/793 |
| | | | | 297/145 |

\* cited by examiner

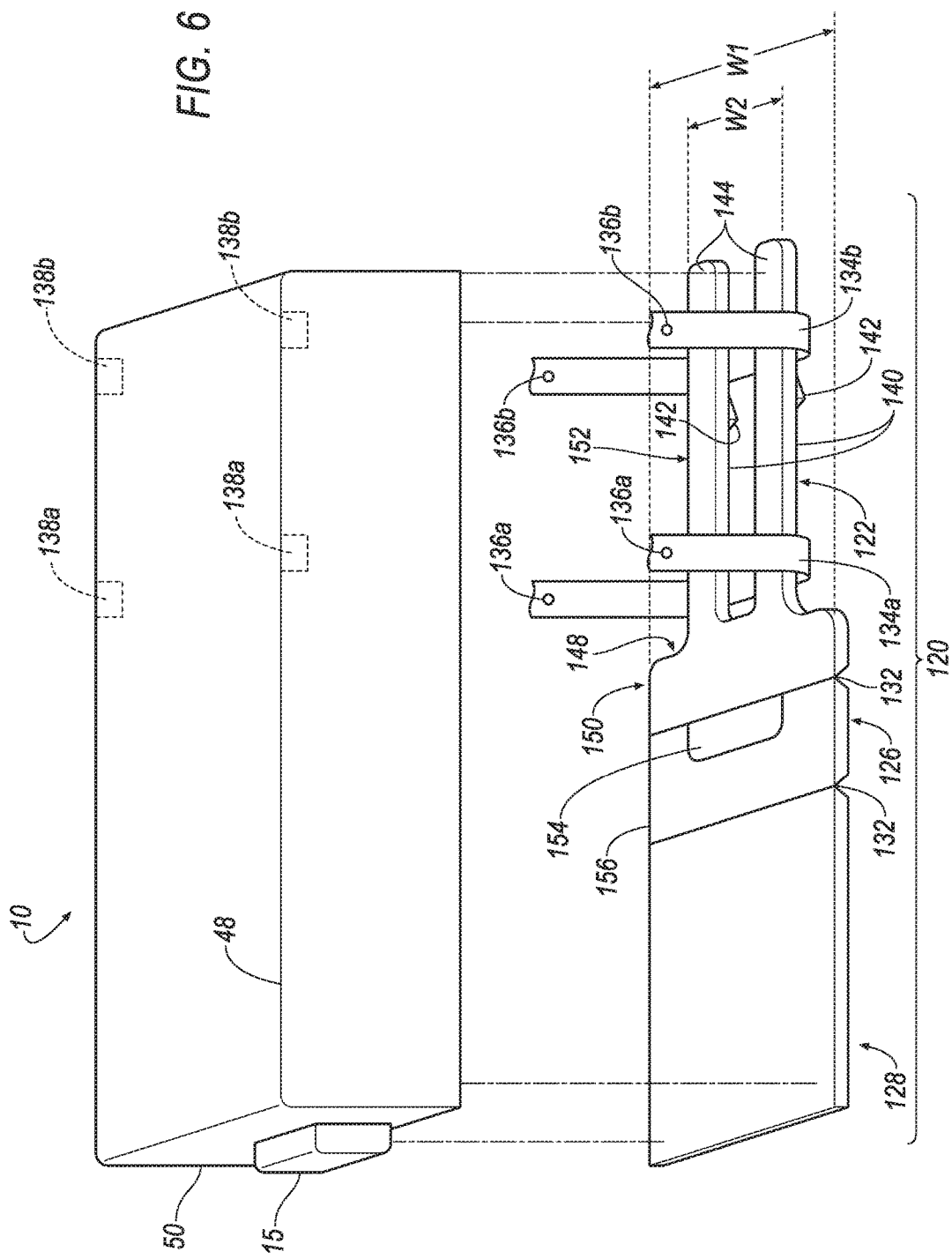

DEPLOYABLE AND RETRACTABLE WRITING SURFACE

TECHNICAL FIELD

The disclosure relates to a writing surface that may be selectively deployed, retracted and stowed with respect to an armrest in a vehicle.

BACKGROUND

There are many vehicle owners that use their vehicles as mobile offices. As such, at times it may become necessary to take notes or create other writings. However, when sitting in the vehicle, there is no readily available surface on which to write, except for an armrest in the vehicle console. However, the armrest is not designed as a writing surface. Instead, it is typically constructed of a soft, compressible material that is designed for comfort for either a passenger or vehicle driver's arm.

One option to provide a writing surface is for the vehicle occupant to bring a separate clipboard. While a clipboard would provide a writing surface, it may slide and or move along the armrest while in use, especially as the clipboard is longer than the width of the armrest and is likely to come into contact with the vehicle occupant. Moreover, the vehicle occupant must remember to bring the clipboard and find an accessible storage location within the vehicle when not in use.

While the soft, compressible material of the armrest may be replaced with a hard surface, such a construction would be undesirable as it would provide an uncomfortable surface for vehicle occupants when being used as an armrest. Accordingly, an armrest having a selectively stowable writing surface is needed.

SUMMARY

A first exemplary arrangement of a deployable armrest writing assembly comprises an armrest; a writing surface and a bridging segment. The bridging segment is connected to the writing surface and to the armrest. The bridging segment is pivotable with respect to the armrest and the writing surface so as to pivot the writing surface 180° from a storage configuration to a deployed configuration over a top surface of the armrest.

A second exemplary arrangement of a selectively deployable armrest writing assembly comprises an armrest; a writing surface, a bridging segment and a sliding member. The sliding member is mounted to the armrest for selective sliding movement with respect to the armrest. The bridging segment is hingedly connected to the sliding member. The bridging segment is pivotable with respect to the sliding member and the writing surface so as to pivot the writing surface 180° from a storage configuration to a deployed configuration over a top surface of the armrest.

BRIEF DESCRIPTION OF THE DRAWINGS

FIG. 6 is a perspective view of a second arrangement of a selectively deployable writing surface in a storage configuration;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
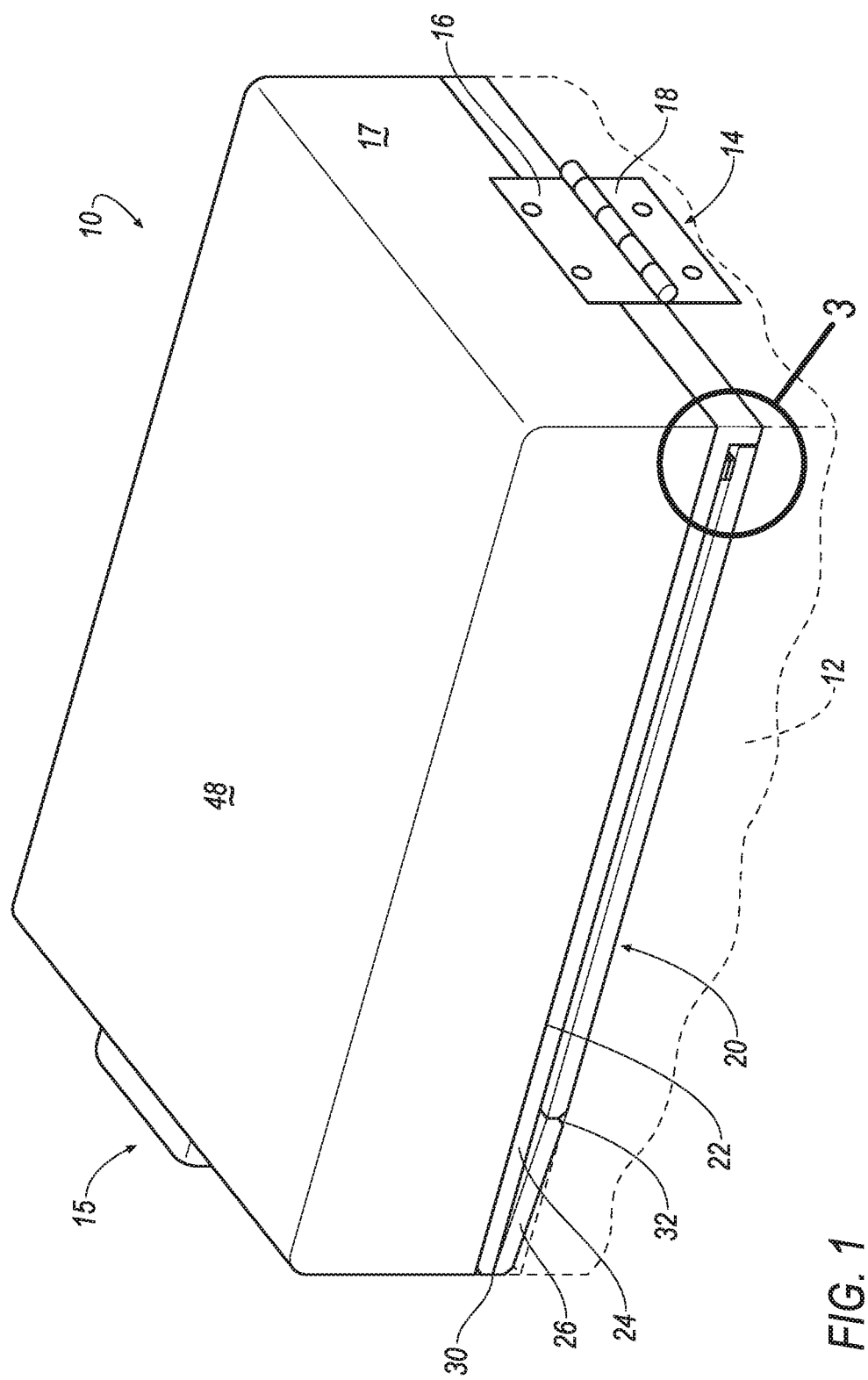
FIG. 1 is a perspective view of a vehicle armrest in a closed configuration.

Referring to FIG. 1, an exemplary arrangement of a vehicle armrest 10 is shown in a closed configuration. The armrest 10 is constructed of a compressible material that is designed for comfort for a user. The vehicle armrest 10 is mounted to a base member 12 (shown in phantom). The base member 12 may be arranged between adjacent vehicle seats (not shown) and may include a storage compartment (not shown) therein, which the armrest 10 selectively covers. A latch mechanism 15 may be provided to selectively secure the armrest 10 to the base member 12 to cover the storage compartment. To allow the armrest 10 to selectively pivot to provide access to the storage compartment, a hinge 14 is provided. The hinge 14 includes a first hinge plate 16 fixedly attached to the armrest 10 along a rear surface 17 of the armrest 10 and a second hinge plate 18 fixedly attached to the base member 12.

Figure 2:
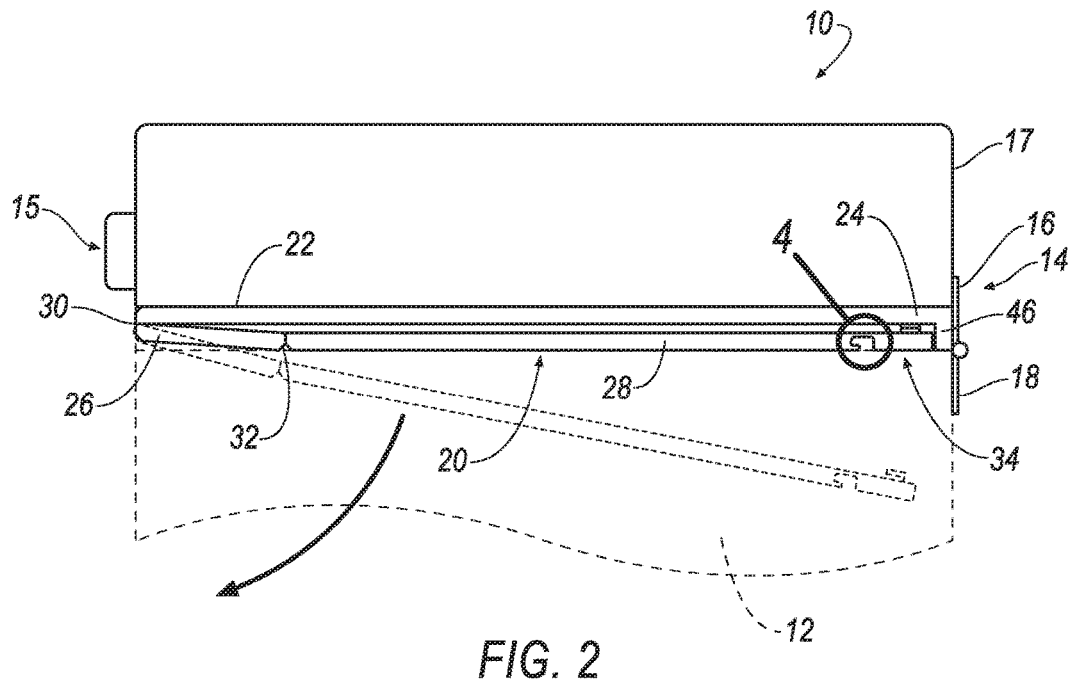
FIG. 2 is a side elevational view of the vehicle armrest of FIG. 1 in the closed configuration.
Figure 3:
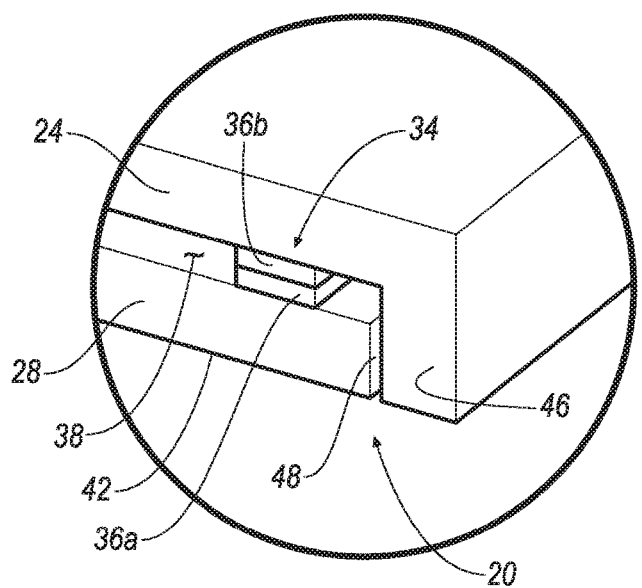
FIG. 3 is an enlarged view of area 3 of FIG. 1 illustrating a holding arrangement for retaining a first arrangement of a selectively deployable writing surface assembly in a storage configuration.

Attached to the armrest 10 is a selectively deployable writing surface assembly 20. In FIGS. 1-3, the writing surface assembly 20 is shown in a storage configuration. When in the storage configuration, the writing surface assembly 20 is stored beneath the armrest 10, such that the writing surface assembly 20 doesn't interfere with traditional use of a vehicle armrest 10. In one exemplary configuration, as illustrated in FIG. 1, the writing surface assembly 20 is folded and disposed beneath a bottom surface 22 of armrest 10. Alternatively, the writing surface assembly 20 may be sized to be smaller than an outer periphery of the armrest 10 such that the writing surface assembly 20 will extend down into the storage compartment when the armrest 10 is in the closed configuration and will not be visible.

Referring to FIGS. 1-3, details of a first exemplary arrangement of a writing surface assembly 20 will now be discussed. More specifically, writing surface assembly 20 comprises a mounting portion 24, a bridging segment 26, and a writing surface 28. The mounting portion 24 is fixed to the bottom surface 24 of the armrest 10. The mounting portion 24 is connected to the bridging segment 26 via a hinge 30 such that the bridging segment 26 is able to pivot with respect to the mounting portion 24. In one exemplary arrangement, the hinge 30 is a living hinge.

The writing surface 28 is also connected to the bridging segment 26 via a hinge 32, opposite the hinge 30. The writing surface 28 may further include a holding arrangement 34, best seen in FIG. 3. In one exemplary arrangement, the holding arrangement 34 further comprises one or more magnets 36a disposed on a first surface 38 of the writing surface 28. Corresponding magnets 36b are disposed on a bottom surface 40 of the mounting portion 24. When the writing surface assembly 20 is in the storage configuration, the writing surface 28 is moved toward the bottom surface 40 of the mounting portion 24 until the magnets 36a, 36b lock together. A second surface 42 of the writing surface 28 may include a finger pull 44 disposed thereon to provide leverage to pull the magnets 36a, 36b away from one another, when moving the writing surface 28 from the storage configuration to a deployed configuration. Other mechanisms, such as pull straps (not shown) for pulling the writing surface 28 away from the mounting portion 24 are also contemplated. However, to maximize the effective working space of the writing surface 28, the finger pulls 44 will be disposed adjacent to a peripheral edge of the writing surface 28.

The mounting portion 24 may further comprise a retaining lip 46 that extends downwardly from the bottom surface 40. When the writing surface 28 is in the storage configuration, an end surface 48 of the writing surface 28 faces the retaining lip 46. The retaining lip 46 serves to prevent the writing surface 28 from items in the storage compartment of the base member 12 from becoming disposed between the mounting portion 24 and the writing surface 28 and unintentionally dislodging the writing surface 28 from the storage configuration.

Figure 5:
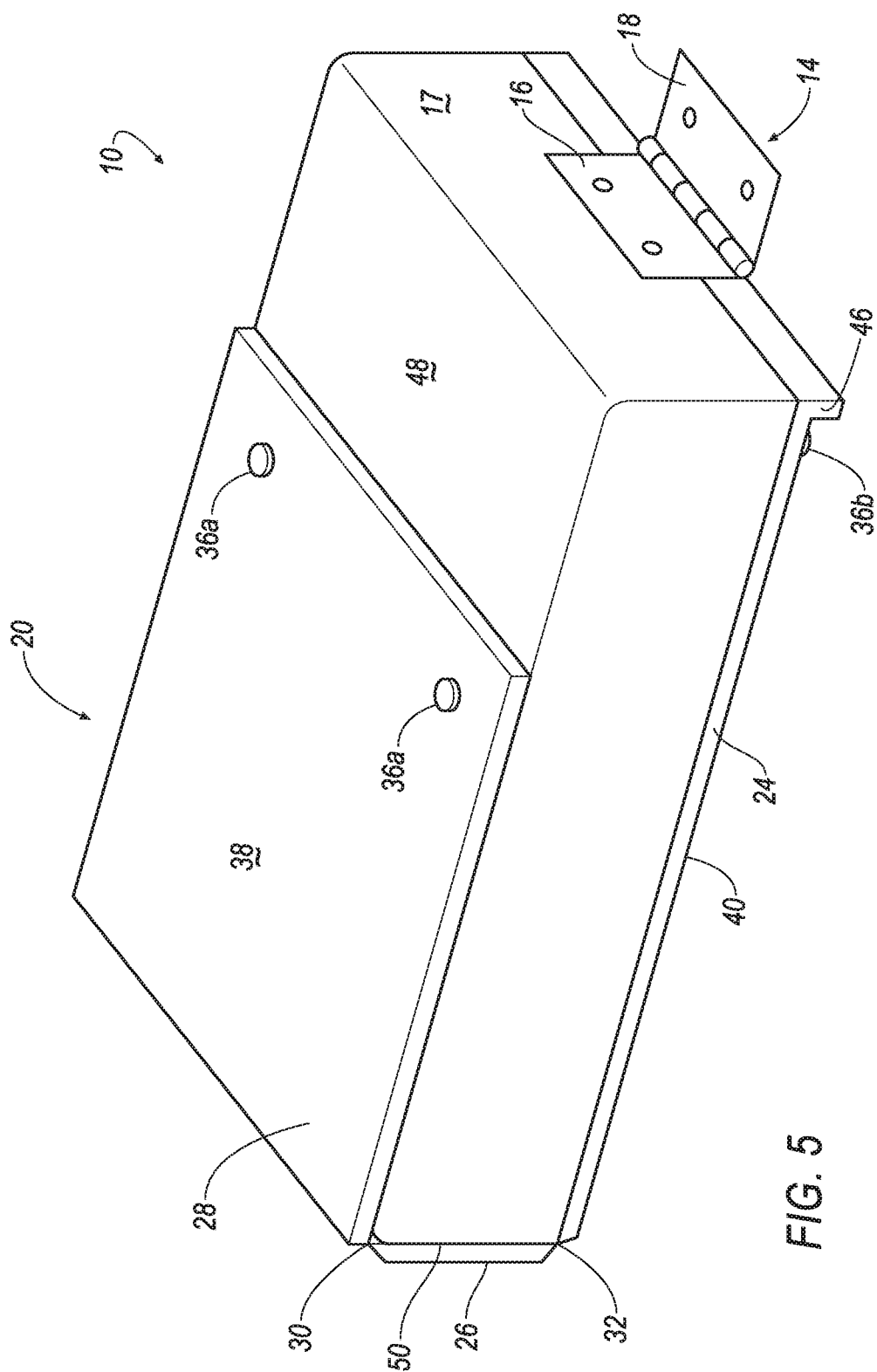
FIG. 5 is a perspective view of the selectively deployable writing surface assembly in a deployed configuration.

With reference to FIGS. 2 and 5, movement of the writing surface assembly 20 from the storage configuration to the deployed configuration will now be described. Starting from the storage configuration shown in FIG. 2, the armrest 10 is first pivoted upwardly about the hinge 14, to provide access to the writing surface assembly 20. Next, the writing surface 28 is pulled away from the mounting portion 24, as shown in phantom. If a pulling mechanism, such as a finger pull 44 is provided, a finger is used apply a force on the writing surface 28 to overcome the magnetic attraction force of the magnets 36a, 36b so as to separate the magnets 36a, 36b.

Once the writing surface 28 is separated from the mounting portion 24, the writing surface 28 is positioned over and into frictional contact with the top surface 48 of the armrest 10 to position the writing surface 28 in the deployed configuration. More specifically, when moving the writing surface 28 into the deployed configuration, the bridging segment 26 is pivoted about the hinge 30 so as to cover a front surface 50 of the armrest 10. As most armrests 10 include a latch mechanism 15, the bridging segment 26 may be provided with an opening (not visible in this embodiment, but an example of which is illustrated in FIG. 6) positioned inbound of a peripheral edge of the bridging segment 26. The opening is configured to extend around the latch mechanism 15.

Once the bridging segment 26 covers the front surface 50, the writing surface 28 is pivoted about hinge 32 such that the writing surface 28 covers and overlays the armrest 10. This action positions the writing surface 180° from the storage configuration. Once in this position, the writing surface 28, which is constructed of a non-compressible material, may be used to write on.

Referring to FIG. 6, a second arrangement of a selectively deployable writing surface assembly 120 is illustrated in the storage configuration. Writing surface assembly 120 is configured to be mounted from the armrest 10.

The writing surface assembly 120 comprises a sliding member 122, a bridging segment 126 and a writing surface 128. The sliding member 122 is hingedly connected to the bridging segment 126 by a hinge 130. In one exemplary arrangement the hinge 130 is a living hinge. The bridging segment 126 is further hingedly connected to the writing surface 128 by a hinge 132. Hinge 132 may also be constructed as a living hinge.

In one exemplary arrangement, the sliding member 122 is suspended from the armrest 10 by one or more straps 134a, 134b. More specifically, the straps 134a, 134b have ends 136a, 136b, fixedly attached to a fixation point 138a, 138b within the armrest 10. The sliding member 122 is slidable with respect to the straps 134a, 134b. To prevent the sliding member 122 from becoming disengaged from both straps 134a, 134b and to allow the writing surface 128 to move a sufficient distance from the armrest 10 to properly position the writing surface 128 on the armrest 10 in a deployed configuration, a bottom surface 140 of the sliding member 122 may be provided with stop members 142. Stop members 142 protrude downwardly from the bottom surface 140 of the sliding member 122 and are configured to frictionally engage strap 134a to prevent the sliding member 122 from traveling any further.

In one configuration, the sliding member 122 may be configured with parallel legs 144 that define a gap 146 therebetween, as shown in FIG. 6. The gap 146 can be sized to accommodate cup holders (not shown) or other storage compartment (not shown) that extend downwardly into a section of the armrest 10.

Alternatively, the peripheral edge 148 of the sliding member 122 may be configured to extend inwardly to define a first section 150 having a first width W1 and a second section 152 having a second width W2, wherein the first width W1 is less than the second width W2. With this configuration, the second section W2 (i.e. legs 144) may be sized to extends between adjacent cup holders. However, it is understood that the sliding member 122 may be configured in a variety of designs, to achieve desirable weight, stiffness, and/or to avoid interference of objects like cup holders.

Figure 4:
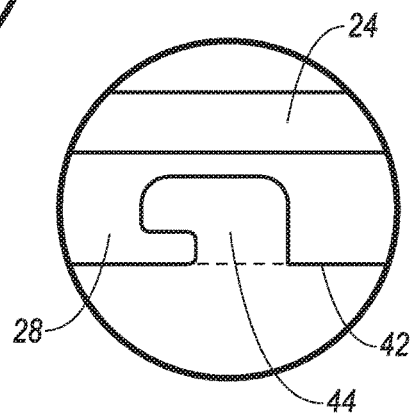
FIG. 4 is an enlarged elevational view of a finger pull mechanism.

In operation, the sliding member 122 of FIG. 6 may be moved to the deployed configuration as follows. Starting from the storage configuration shown in FIG. 6, the armrest 10 is first pivoted upwardly about a hinge (as described in connection with FIG. 2), to provide access to the writing surface assembly 120. Next, the writing surface 128, is pulled laterally out and away from the armrest 10, generally parallel to the armrest 10. To facilitate the pulling action, a pulling mechanism, such as a finger pull 44 (shown in FIG. 4) or a strap (not shown) to cause the sliding member 122 to slide with respect to the straps 134a, 134b, until the stop members 142 engage strap 134a. Once the stop members 142 engage strap 134a, both the writing surface 128 and the bridging segment 126 will be disposed outwardly from the armrest 10.

In one embodiment, the writing surface 128 is stored in a folded configuration, similar to that shown in FIG. 2. For example, the writing surface 128 may be provided with one or more magnets (not shown) that engage corresponding magnets disposed on an underside of the sliding member 122, as described above in connection with the arrangement shown in FIG. 2. Thus, writing surface 128 must be disengaged from the sliding member 122 prior to pulling the writing surface 128 laterally from the armrest 10.

Once the writing surface 128 and bridging segment 126 have cleared the armrest 10, the writing surface 128 is positioned over and into frictional contact with the top surface 48 of the armrest 10 to position the writing surface 128 in the deployed configuration in a similar fashion as described above in connection with the writing surface assembly 20. More specifically, when moving the writing surface 128 into the deployed configuration, the bridging segment 126 is pivoted about the hinge 130 so as to cover the front surface 50 of the armrest 10. As most armrests 10 include a latch mechanism 15, the bridging segment 126 may be provided with an opening 154 positioned inbound of an outer edge 156 of the bridging segment 126. The opening 154 is configured to extend around the latch mechanism 15 disposed adjacent the bottom surface 22 of the armrest 10 when the writing surface assembly 120 is in the deployed configuration. However, it is understood that the present disclosure is not limited to this arrangement. More specifically, portions of the writing surface 128 may also be provided with an aperture to accommodate armrest latch mechanism that are disposed on a top surface of the armrest, as well.

Once the bridging segment 126 covers the front surface 50, the writing surface 128 is pivoted about hinge 132 such that the writing surface 128 covers and overlays the armrest 10. Once in this position, the writing surface 128, which is constructed of a non-compressible material, may be used to write on.

When it is desired to return the writing surface assembly 120 to the stored configuration, the writing surface 128 is lifted up from the armrest 10 and pivoted about hinge 132. The bridging segment 126 is then pivoted about hinge 130 and the writing surface assembly 120 is then slid under the armrest 10. When the writing surface 128 and bridging segment 126 are both positioned under the armrest 10, the writing surface assembly 120 is in the storage configuration. Alternatively, the writing surface 128 is pivoted about the hinge 132 to engage magnets disposed on the writing surface with the corresponding magnets disposed on the underside of the sliding member 122. In either arrangement, the stopper members 142 may contact strap 134b to serve as a tactile indicator that the writing surface assembly 120 has returned to the storage configuration.

Figure 7A:
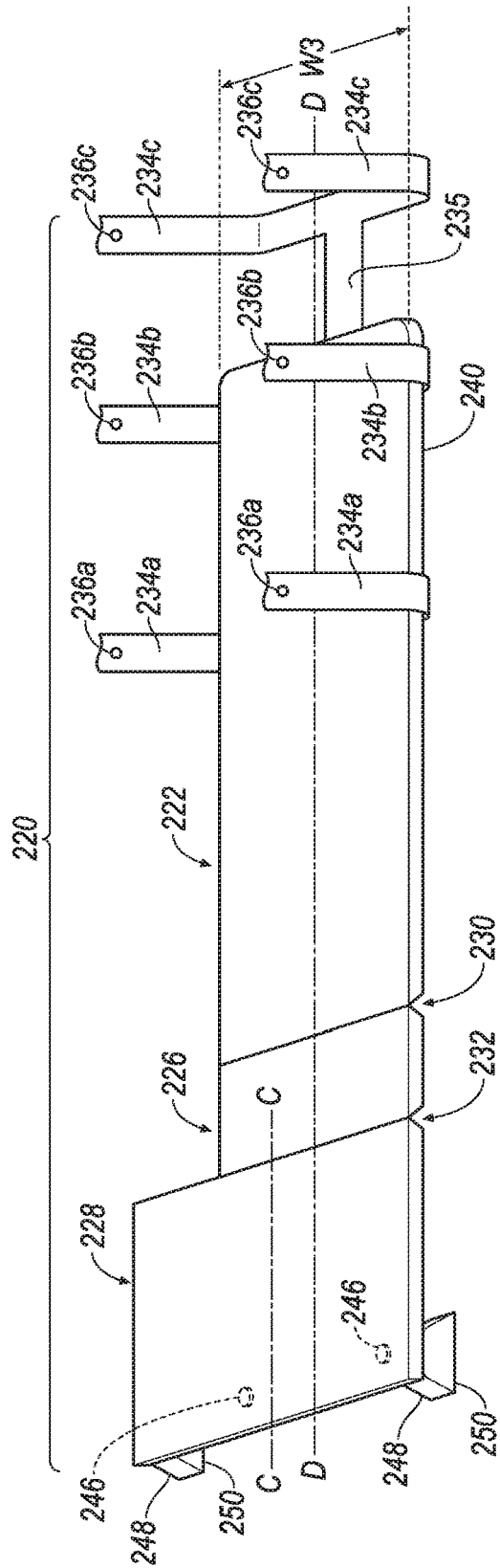
FIG. 7A is a perspective view of a third arrangement of a selectively deployable writing surface of in an intermediate position.
Figure 7B:
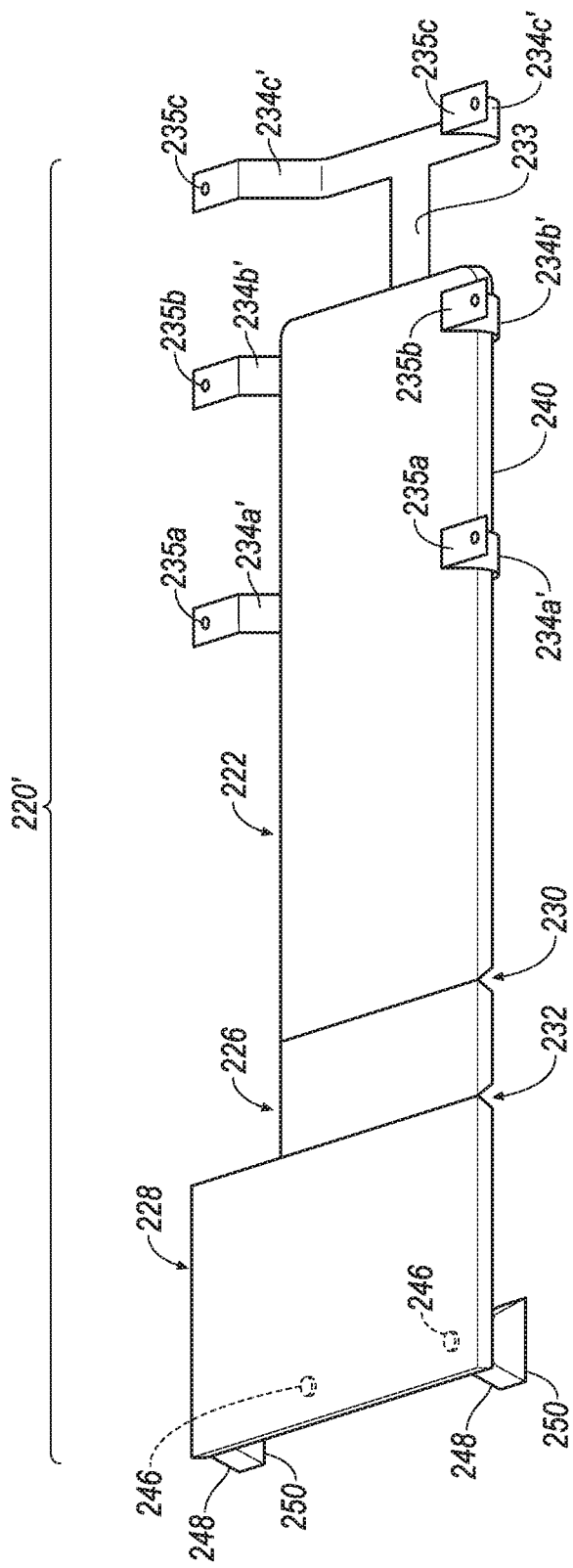
FIG. 7B is a perspective view of the alternative holding arrangement for the selectively deployable writing surface of FIG. 7A in an intermediate position.

Referring to FIGS. 7A and 7B, further alternative arrangements of a selectively deployable writing surface assembly 220/220' will be described. In FIGS. 7A and 7B, the writing surface assemblies 220/220' are shown in an intermediate position, as will be discussed below in further detail.

The writing surface assemblies 220/220' each comprise a sliding member 222, a bridging segment 226 and a writing surface 228. The sliding member 222 is hingedly connected to the bridging segment 226 by a hinge 230. In one exemplary arrangement the hinge 230 is a living hinge. The bridging segment 226 is further hingedly connected to the writing surface 228 by a hinge 232. Hinge 232 may also be constructed as a living hinge.

In one exemplary arrangement, the sliding member 222 is suspended within the armrest 10 (shown in FIG. 1) by one or more straps 234a, 234b, 234c. More specifically, the straps 234a, 234b, 234c have ends 236a, 236b, 236c that are fixedly attached to corresponding fixation points (not shown) within the armrest 10. The straps 234a, 234b, 234c may be joined together by a connector strap 235. Alternatively, referring to FIG. 7B, the sliding member 222 may be suspended within the armrest 10 by one or more brackets 234a', 234b', 234c'. The brackets 234a', 234b', 234c' each include a mounting flange 235a, 235b, 235c that may be fixed to an underside of an armrest 10. A connector bracket 233 may also be provided so as to increase the structural rigidity of brackets 234a', 234b', 234c'.

The sliding member 222 is slidable with respect to the straps 234a, 234b, 234c and/or brackets 234a', 234b', 234c'. To prevent the sliding member 222 from becoming completely disengaged from the straps 234a, 234b, 234c and/or the brackets 234a', 234b', 234c' and to allow the writing surface 228 to move a sufficient distance from the armrest 10 to properly position the writing surface 228 in a deployed configuration, a bottom surface 240 of the sliding member 122 may be provided with stop members 142 like those shown in FIG. 6.

In one configuration, the sliding member 222 may be configured as unitary member having a width W3 substantially constant along its length. In one exemplary arrangement, the sliding member 222 is disposed to be offset with respect to a center axis C-C of the writing surface 228, along a center axis D-D. More specifically, can be sized to accommodate cup holders (not shown) or other storage compartment (not shown) that extend downwardly into a section of the armrest 10. However, it is understood that the sliding member 222 may be configured in a variety of designs, to achieve desirable weight, stiffness, and/or to avoid interference of objects like cup holders.

Figure 8:
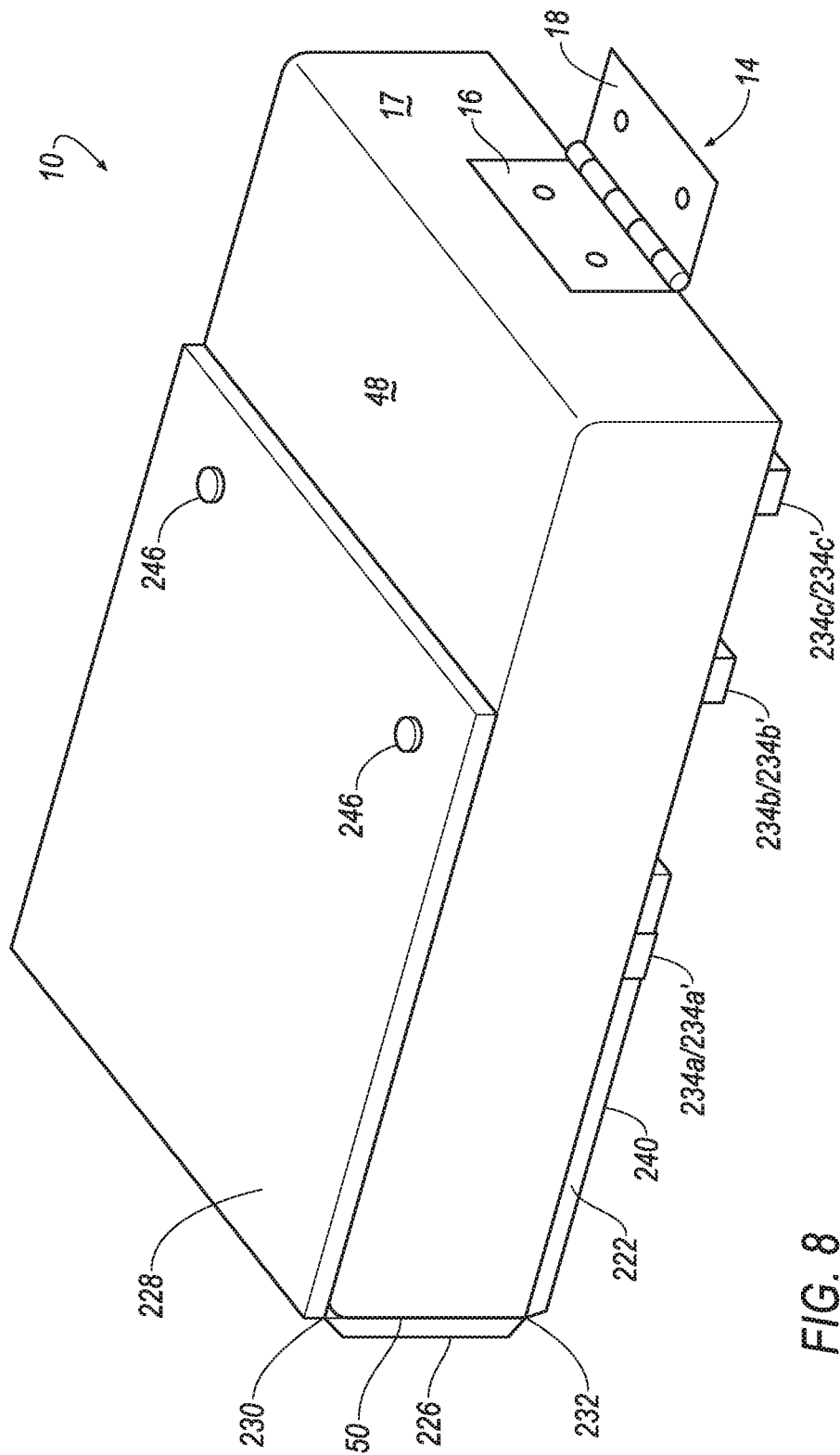
FIG. 8 is a perspective view of the selectively deployable writing surface in a deployed configuration.
Figure 9:
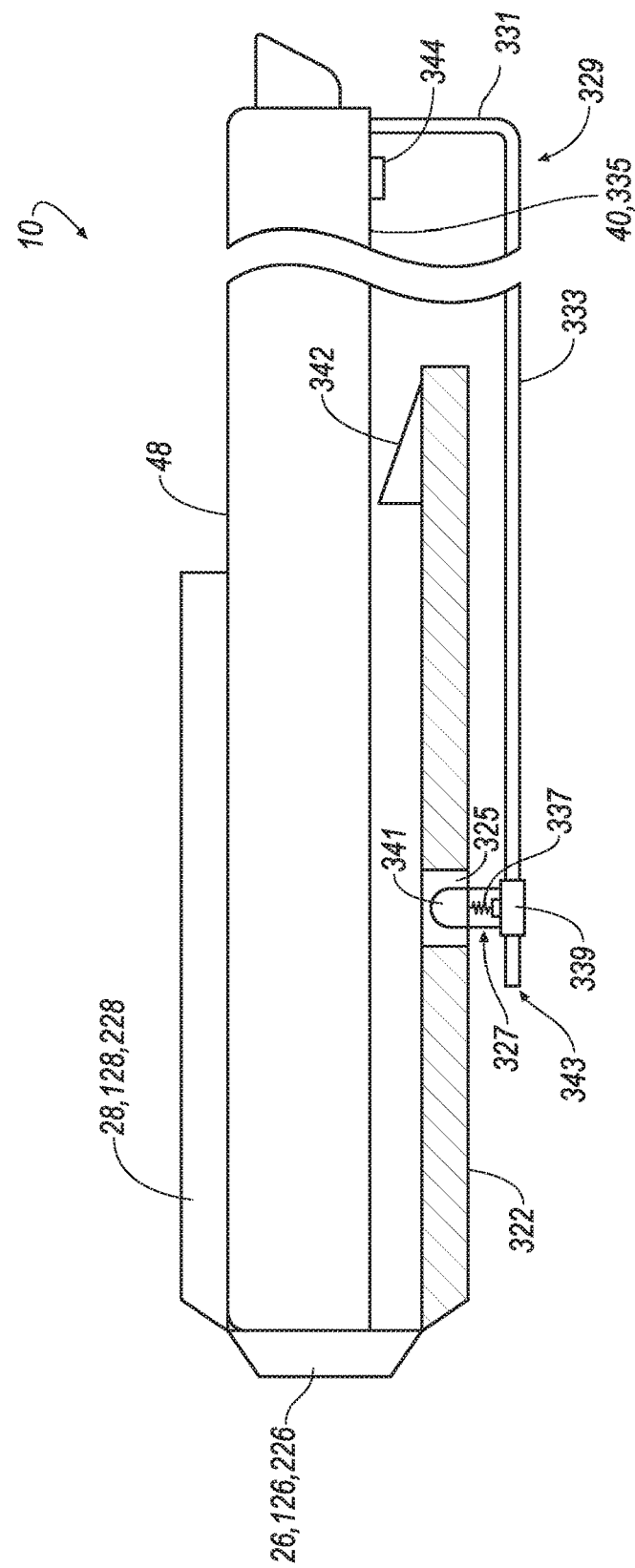
FIG. 9 is a partial cross-sectional view of an alternative holding arrangement for retaining the selectively deployable writing surface in the deployed configuration.

In one exemplary mode of operation, the sliding members 222 of FIGS. 7A-7B may be moved to the deployed configuration shown in FIG. 8 as follows. Starting from a storage configuration, whereby the sliding member 222 is fully supported by the straps 234a, 234b, 234c and/or brackets 234a', 234b', 234c', similar to the configuration of sliding member 122 shown in FIG. 6, the armrest 10 is first pivoted upwardly about a hinge (as described in connection with FIG. 2), to provide access to the writing surface assembly 220. Next, the writing surface 228 is pulled laterally out and away from the armrest 10, generally parallel to the armrest 10. To facilitate the pulling action, a pulling mechanism, such as a finger pull 44 (shown in FIG. 4) or a strap (not shown) may be provided to cause the sliding member 222 to slide with respect to the straps 234a, 234b, 234c and/or brackets 234a', 234b', 234c' until the bridge segment 226 and the writing surface 228 are extracted from the armrest 10. If provided, the stop members 142 will engage strap 234a or bracket 234a'. Once the stop members 142 engage strap 234a and/or bracket 234a', both the writing surface 228 and the bridging segment 226 will be disposed outwardly from the armrest 10.

Alternatively, the writing surface 228 is stored in a folded configuration, similar to that shown in FIG. 2. For example, the writing surface 228 may be provided with one or more magnets 246 (shown in phantom) that engage corresponding magnets disposed on an underside of the sliding member 222 (not visible), as described above in connection with the arrangement shown in FIG. 2. Thus, writing surface 222 must be disengaged from the sliding member 222 prior to pulling the writing surface 228 laterally from the armrest 10.

Once the writing surface 228 and bridging segment 226 have cleared the armrest 10, in one exemplary arrangement, the writing surface 228 may be positioned over and into frictional contact with the top surface 48 of the armrest 10 to position the writing surface 228 in the deployed configuration in a similar fashion as described above in connection with the writing surface assemblies 20 and 120. More specifically, when moving the writing surface 228 into the deployed configuration, the bridging segment 226 is pivoted about the hinge 230 so as to cover the front surface 50 of the armrest 10. As most armrests 10 include a latch mechanism 15, the bridging segment 226 may be provided with an opening (similar to opening 154 that is shown in FIG. 6) positioned inbound of an outer edge of the bridging segment 226. The opening is configured to extend around the latch mechanism 15 when the writing surface assembly 220 is in the deployed configuration.

Once the bridging segment 226 covers the front surface 50, the writing surface 228 is pivoted about hinge 232 such that the writing surface 228 covers and overlays the armrest 10. Once in this position, the writing surface 228, which is constructed of a non-compressible material, may be used to write on.

As an alternative arrangement, the writing surface 228 may be provided with optional support nubs 248, as shown in FIGS. 7A and 7B. The support nubs 248 are fixed to one surface of the writing surface 228. The bottom surface 250 of the support nubs 248 is generally planar and are configured to rest against a portion of a center console of a vehicle (not shown). Thus, rather than pivoting the bridging segment 226 and writing surface 228 to position the writing surface 228 on top of the armrest 10, the writing surface 228 only needs to be slid outwardly from the armrest. With this configuration, the writing surface 228 may be used to write on forward of the armrest 10.

When it is desired to return the writing surface assembly 220 to the stored configuration, the writing surface 228 is lifted up from the armrest 10 and pivoted about hinge 232. The bridging segment 226 is then pivoted about hinge 230 so as to return the writing surface assembly 220 is in a generally planar orientation. Next, the writing surface assembly 220 is then slid under the armrest 10 until the sliding member 222 is fully seated on the straps 234a, 234b, 234c and/or brackets 234a', 234b', 234c'. When the writing surface 228 and bridging segment 226 are both positioned under the armrest 10, the writing surface assembly 228 is in the storage configuration. Alternatively, the writing surface 228 is pivoted about the hinge 232 to engage magnets disposed on the writing surface 228 with the corresponding magnets disposed on the underside of the sliding member 222. In either arrangement, the stopper members 142 may contact strap 134b and/or bracket 134b' to serve as a tactile indicator that the writing surface assembly 220 has returned to the storage configuration.

To prevent the writing surface 28/128/228 from inadvertently moving from a deployed configuration, once disposed on the top surface 48 of the armrest 10, the sliding member 322 may be provided with a locking channel 325. The locking channel 325 cooperates with a locking mechanism 327 that is disposed on a support rail 329. More specifically, the support rail 329 includes a first section 331 and a second section 333. The first section 331 extends downwardly from a bottom surface 40/335 of the armrest 10 a sufficient distance to position the second section 333 below the sliding member 322. The locking mechanism 327 is fixed to an end of the second section 333.

The locking mechanism 327 includes a spring 337 that is fixedly connected to a mounting member 339 and a locking element 341. The spring 337 serves to bias the locking element 341 away from the mounting member 339.

In operation, the sliding member 322 will move outwardly away from the armrest 10 to position the writing surface 28/128/228 in the deployed configuration. However, as the sliding member 322 moves past the locking mechanism 327, the spring 337 will force the locking element 341 into the locking channel 325, thereby frictionally retaining the sliding member 322 from further undesired movement. To release the sliding member 322, an end 343 is pulled downwardly sufficiently for the locking element 341 to clear the locking channel 325, while the sliding member 322 is returned to the storage configuration.

The bottom surface 40/355 may be provided with a first stopper member 344 that cooperates with a second stopper member 342 disposed on the sliding member 322. More specifically, when the sliding member 322 is returned to the storage configuration, the first and second stopper members 344, 342 will operate as a tactile indicator that the sliding member 322 is fully seated within the armrest 10 in the storage configuration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A deployable armrest writing assembly, comprising:
   an armrest;
   a writing surface; and
   a bridging segment connecting the writing surface to the armrest;
   wherein the bridging segment is pivotable with respect to the armrest and the writing surface is pivotable with respect to the bridging segment such that the bridging segment and the writing surface are configured to deploy from a storage configuration under the armrest to a deployed configuration in which the bridging segment is adjacent to a side of the armrest and the writing surface is over the armrest and rotated 180° relative to the storage configuration.

2. The deployable armrest writing assembly of claim 1, further comprising a locking mechanism for selectively securing the writing surface in the storage configuration.

3. The deployable armrest writing assembly of claim 2, further comprising a mounting portion secured to a bottom surface of the armrest, wherein the bridging segment is pivotably connected to the mounting portion.

4. The deployable armrest writing assembly of claim 3, wherein the locking mechanism further comprises at least one first magnet disposed on a bottom surface of the mounting portion, the first magnet cooperating with a corresponding at least one second magnet disposed on a top surface of the writing surface to secure the writing surface to the mounting portion when the writing surface is in the storage configuration.

5. The deployable armrest writing assembly of claim 4, wherein the writing surface further comprises a pulling mechanism for overcoming an attraction force of the first and second magnets to move the writing surface from the storage configuration to the deployed configuration.

6. The deployable armrest writing assembly of claim 1, wherein the writing surface is connected to the bridging segment by a first hinge.

7. The deployable armrest writing assembly of claim 6, wherein the bridging segment includes an opening therethrough, positioned along a second hinge that pivotably connects the bridging segment to the armrest, the opening sized to permit a latch for securing the armrest into a closed position with respect to a vehicle console to pass through.

8. The deployable armrest writing assembly of claim 1, wherein the bridging segment is pivotably connected to a sliding member and wherein the sliding member is connected to the armrest for sliding movement.

9. The deployable armrest writing assembly of claim 8, wherein the sliding member is suspended from a bottom surface of the armrest by spaced apart straps or brackets.

10. The deployable armrest writing assembly of claim 9, wherein a bottom surface of the sliding member further comprises at least one stop member that operatively engages one of the straps or brackets to limit movement of the sliding member with respect to the armrest.

11. The deployable armrest writing assembly of claim 8, wherein the sliding member further comprises first and second leg members spaced apart from one another to define a gap therebetween.

12. The deployable armrest writing assembly of claim 8, wherein the writing surface is disposed about a first central axis and wherein the sliding member is disposed along a second central axis that is offset from the first central axis.

13. The deployable armrest writing assembly of claim 8, wherein the writing surface further includes at least one support nub attached to a surface thereof, the support nub having a bottom surface for engaging a portion of vehicle console when the writing surface is in an intermediate configuration.

14. The deployable armrest writing assembly of claim 8, further comprising a support rail extending from the armrest and having a portion oriented below the sliding member, the support rail carrying a locking mechanism thereon, wherein the sliding member further comprises a locking channel formed in a bottom surface of the sliding member, the locking mechanism engaging the locking channel when the sliding member is slid to a predetermined position with respect to the armrest.

15. A deployable armrest writing assembly, comprising:
an armrest;
a writing surface; and
a bridging segment and a sliding member,
wherein the sliding member is mounted to the armrest for selective sliding movement with respect to the armrest,
wherein the bridging segment is hingedly connected to the sliding member, and
wherein the bridging segment is pivotable with respect to the sliding member and the writing surface is pivotable with respect to the bridging segment such that the bridging segment and the writing surface are configured to deploy from a storage configuration under the armrest to a deployed configuration in which the bridging segment is adjacent to a side of the armrest and the writing surface is over of the armrest and rotated 180° relative to the storage configuration.

16. The deployable armrest writing assembly of claim 15, wherein the sliding member includes at least one first magnet disposed on a bottom surface of the sliding member, the first magnet cooperating with a corresponding at least one second magnet disposed on a top surface of the writing surface to secure the writing surface to the sliding member when the writing surface is in the storage configuration.

17. The deployable armrest writing assembly of claim 15, wherein the writing surface is connected to the bridging segment by a first hinge and wherein the bridging segment is connected to the sliding member by a second hinge.

18. The deployable armrest writing assembly of claim 17, wherein a bottom surface of the sliding member further comprises at least one stop member that operatively engages one of a strap or bracket that suspends the sliding member from the armrest to limit movement of the sliding member with respect to the armrest.

19. The deployable armrest writing assembly of claim 15, wherein the sliding member includes a first section having a first width and a second section having a second width that is smaller than the first width.

20. The deployable armrest writing assembly of claim 19, wherein the second section further comprises a pair of leg members defining a gap therebetween.

* * * * *